United States Patent
Halse et al.

(10) Patent No.: US 6,283,552 B1
(45) Date of Patent: Sep. 4, 2001

(54) FASTENER FOR SECURING A BOLSTER TO A SEATING SURFACE

(75) Inventors: Larry E. Halse, Milford; Jean-Paul Schowalter, Ypsilanti; Lance E. Larsen, Southfield; John Krsteski, Shelby Township; Daniel J. Koester, Ann Arbor, all of MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/377,469

(22) Filed: Aug. 19, 1999

(51) Int. Cl.$^7$ ........................................ A47C 7/00
(52) U.S. Cl. .................... 297/440.1; 297/218.1; 297/452.6
(58) Field of Search .............. 297/440.1, 452.6, 297/440.11, 452.59, 452.62, 218.2, 218.1

(56) References Cited

U.S. PATENT DOCUMENTS 5,582,463   12/1996   Linder et al. .

*Primary Examiner*—Peter M. Cuomo
*Assistant Examiner*—Stephen Vu
(74) *Attorney, Agent, or Firm*—Foley & Lardner

(57) ABSTRACT

A seat assembly for a vehicle including a seat frame, a seating surface secured to the seat frame and having spaced apart, generally parallel first fibers and spaced apart second fibers transverse to the first fibers, a bolster, and a fastener. The fastener has an attachment member securable to the bolster and a series of hook members extending from the attachment member and insertable between the first fibers and the second fibers of the seating surface. The hook members have a barb portion extending from the hook members to provide retention of the fastener to the first fibers, thereby securing the bolster to the seating surface.

7 Claims, 3 Drawing Sheets

FASTENER FOR SECURING A BOLSTER TO A SEATING SURFACE

TECHNICAL FIELD OF THE INVENTION

This invention generally relates to fasteners and, more specifically, to fasteners having a series of hook members for securing a bolster to a seating surface made of woven fibers.

BACKGROUND OF THE INVENTION

To increase the available interior space and to reduce the weight of a vehicle, many automotive manufacturers are turning towards alternative seat assemblies of their vehicles. One of these alternatives includes utilizing a seating surface made of woven fibers, which is stretched over and secured to a seat frame. The seating surface, also known as a direct suspension seating surface, supports an occupant and dampens the impact or vibration imparted through the vehicle to the occupant, without the use of traditional cloth covered foam cushions over a seat pan or springs.

The direct suspension seat configuration is lighter in weight and requires less interior volume than the traditional seat assembly, and can therefor increase the fuel economy, improve performance, and provide greater interior space without increasing the size of the vehicle. Although very promising, several issues, most notably comfort and to some extent design expectation, have arisen with direct suspension seating surfaces.

Generally, a two-dimensional shape is formed since the direct suspension seating surface is stretched over the seat frame. The two-dimensional shape is obviously different from so-called bucket seats, to which occupants of a vehicle have grown accustomed. Bucket seats have gained popularity over the years because the seat shape tends to support an occupant against the centrifugal forces exerted on the occupant during a turn. Until this time, direct suspension seating surfaces could not provide such support.

Therefore, a need exists for a seat assembly with the weight and dimensional advantages of the direct suspension seating surface, but with the cushioning and the support provided by more traditional seat configurations.

SUMMARY OF THE INVENTION

Accordingly, this invention provides for a seat assembly that overcomes the problems and disadvantages of the conventional techniques in the art. The present invention also provides for a seat assembly with a seat frame, a direct suspension seating surface, a bolster to provide increased support for the occupant, and a fastener to attach the bolster to the seating surface. The present invention further provides for a fastener that attaches a bolster to a direct suspension seating surface of a seat assembly.

Briefly, the seat assembly of the present invention includes a seat frame, a seating surface which is secured to the seat frame and which has spaced apart, generally parallel first fibers and spaced apart second fibers transverse to the first fibers, a bolster, and a fastener. The fastener has an attachment member securable to the bolster and a series of hook members extending from the attachment member which are insertable between the first fibers and the second fibers of the seating surface. The hook members have a barb portion extending from the hook members to provide retention of the fastener to the first fibers, thereby securing the bolster to the seating surface.

BRIEF DESCRIPTION OF THE DRAWINGS

The various advantages of the present invention will become apparent to one skilled in the art upon reading the following specification and by reference to the drawings in which.

DETAILED DESCRIPTION OF THE PREFERRED EMBODIMENT

Figure 1:
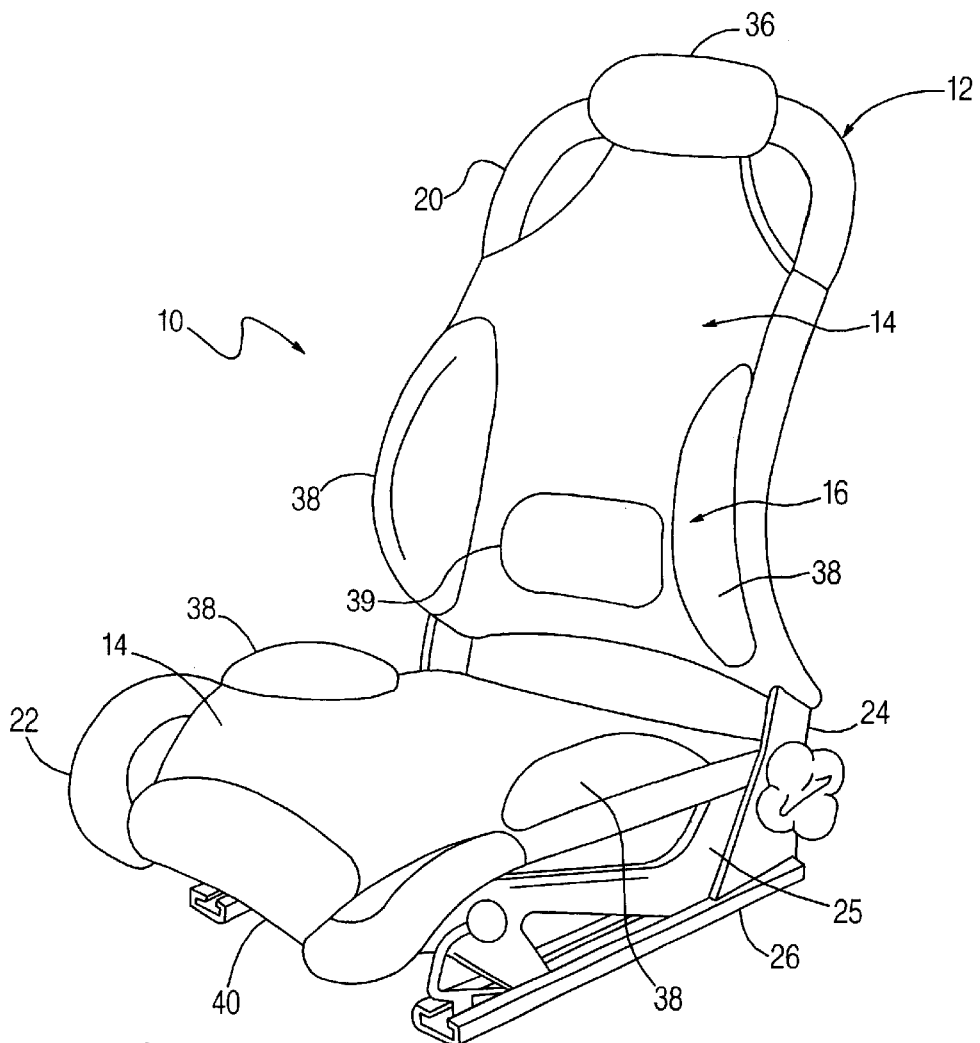
FIG. 1 is a perspective view of the seat assembly according to the present invention.

The following description of the preferred embodiment is merely exemplary in nature, and is in no way intended to limit the invention, or its applications, or uses.

The seat assembly 10 of the present invention includes a seat frame 12, a seating surface 14, bolsters 16, and fasteners 18, as shown in FIGS. 1–7.

The seat frame 12 includes a seat back member 20 extending in an upward direction and a seat bottom member 22 extending in a generally horizontal direction, as shown in FIG. 1. Both seat members 20 and 22 function to provide structural support for the seating surface 14. A recliner mechanism 24 allows selective adjustment of the angle of the seat back member 20 relative to the seat bottom member 22. The seat bottom member 22 attaches to the floor of a vehicle through stanchions 25 attached to a slide track 26. Slide track 26 can be a manual or power system known in the art which allows fore and aft adjustment of the seat assembly 10. The seat frame 12, including the seat members 20 and 22, the recliner mechanism 24, the stanchions 25, and the slide track 26, can be made from a variety of high strength materials, including but not limited to, steel, aluminum, magnesium, plastics, resins, or other similar materials.

Figure 2:
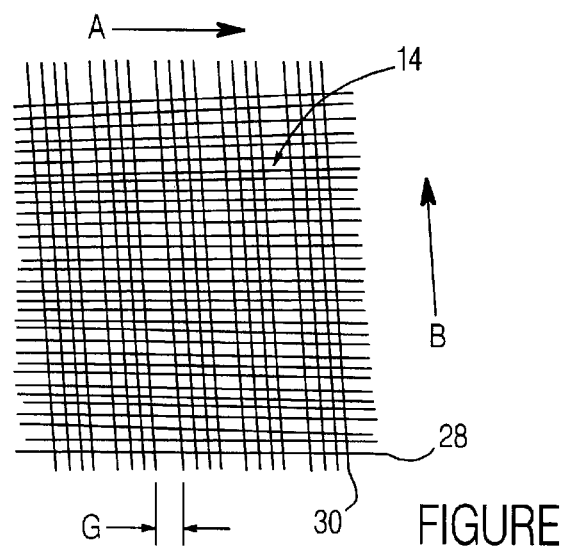
FIG. 2 is a detailed view of a portion of the seating surface of the seat assembly.

The seating surface 14, also known as a direct suspension seating surface, is woven with spaced apart, generally parallel first fibers 28 and spaced apart second fibers 30, as shown in FIG. 2. The first fibers 28 generally point in the direction A and the second fibers 30 generally point in direction B. While the angle between direction A and direction B is preferably 90°, other angles may be used. Further, additional sets of fibers may be included at other angles to provide omni directional stability and uniform support across the seating surface.

In the preferred embodiment, the pattern of the weave between the first fibers 28 and the second fibers 30 is a plain weave with the first fibers 28 extending along a discrete line, although other patterns, such as a pattern with the first fibers 28 interlaced to adjacent first fibers 28, may be used. The weave of the fibers 28 and 30 function to suspend an occupant and to dampen some of the impact and vibration imparted through the vehicle to the occupant. The seating surface 14 is stretched over and secured to the seat frame 12 with J-Clip fasteners (not shown). The preferred J-Clip fastener is disclosed and described in U.S. Pat. No. 5,582,463 invented by Linder et al., which is incorporated in its entirety by this reference.

In the preferred embodiment of the present invention, the first fibers 28 are spaced apart differently than the second fibers 30. The second fibers 30 are grouped in sets of two or more with a gap G between the groups. The gap G allows the insertion of the fastener 18 between the second fibers 30, as explained below. The seating surface 14 can be made from a variety of materials, including but not limited to natural and synthetic fibers, and fiber reinforced or other plastic sheeting. One skilled in the art of seating systems would readily understand how to make and use the seat frame 12, the seating surface 14, and the J-Clip fasteners.

Figure 3:
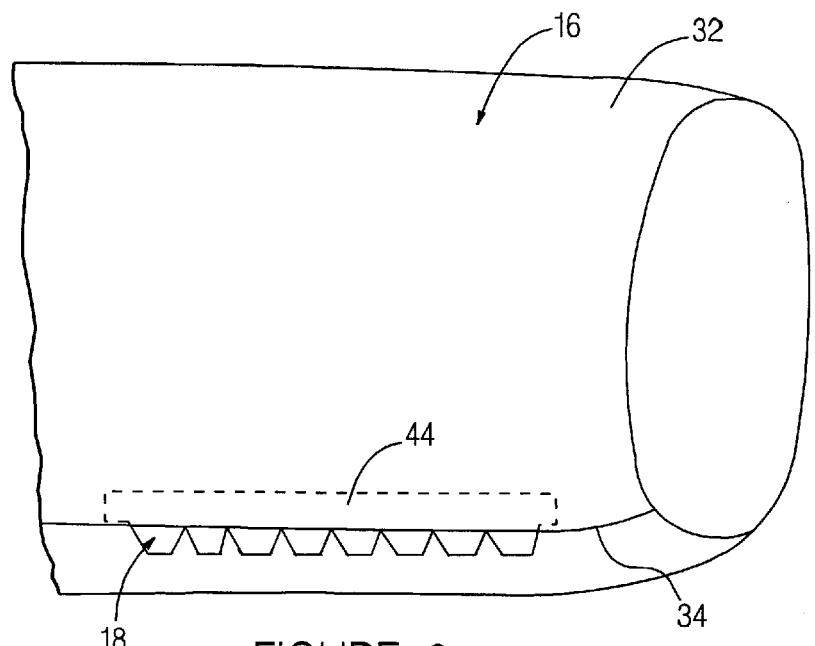
FIG. 3 is a partial view of the bolster with a fastener made in accordance with the teachings of the present invention.

The bolsters 16 include an exterior surface 32 with a seam 34, as shown in FIG. 3, and an interior pad (not shown). The bolster 16 functions to provide additional support for an occupant of the vehicle, and can be used as a headrest bolster 36, as a side bolster 38, a lumbar bolster 39, or as a thigh support bolster 40, as shown in FIG. 1. With particular arrangements of the bolsters 16 to the seating surface 14, the seat assembly 10 can provide support similar to a traditionally constructed seat such as a bucket seat.

The interior pad of the bolster 16 is typically made from a soft and compliant material such as foam. Alternately, a blow molded or otherwise formed plastic interior pad could be used. The exterior surface 32 is typically made from a soft material such as cloth or leather which is wrapped about the interior pad and is sewn closed by the seam 34. A wide variety of methods and materials utilized to produce bolsters in the form of headrests are known and used in the art of seating systems and their manufacture would be readily understood by a person of ordinary skill in the art to apply to the production of the bolsters used in the present invention.

Figure 4:
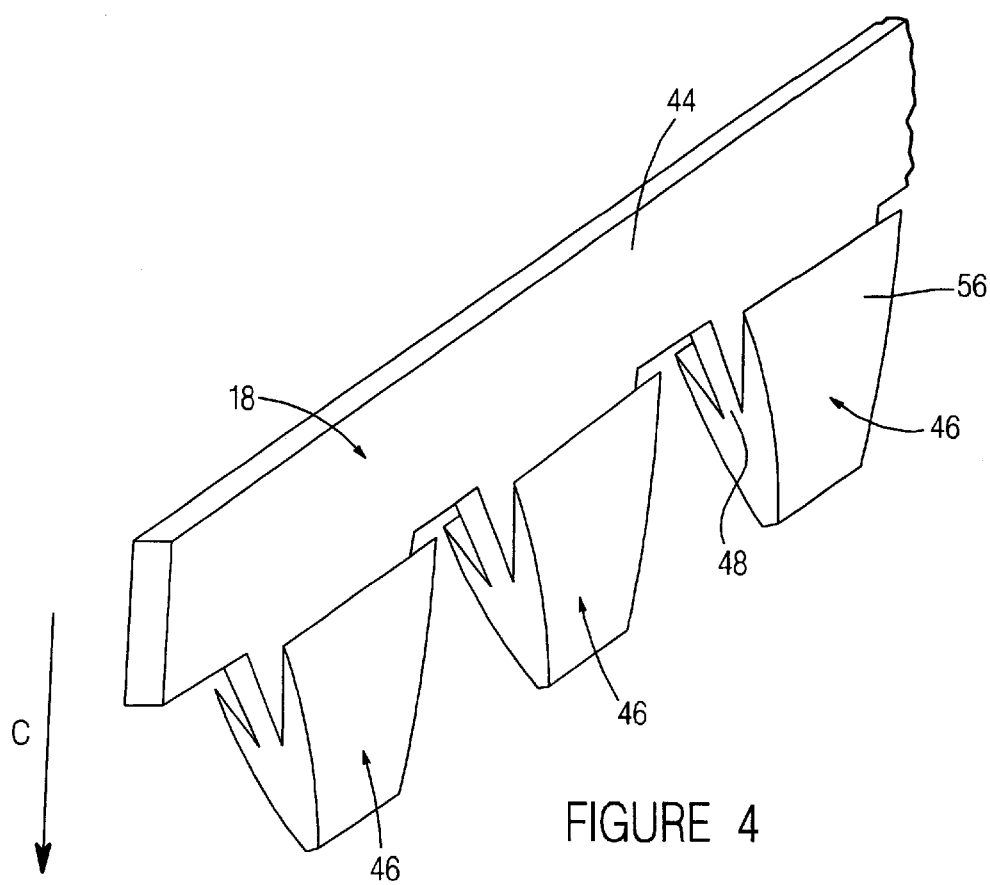
FIG. 4 is a perspective view of a portion of the fastener.

The fastener 18 includes an attachment member 44 that functions to secure the fastener 18 to the bolster 16, as shown in FIGS. 3 and 4. The attachment member 44 has an elongated shape and is generally formed in one plane. In the preferred embodiment, the attachment member 44 of the fastener 18 is sewn within the seam 34 of the bolster 16. In alternative embodiments, the attachment member 44 of the fastener 18 may be glued, stapled, clipped, sonic welded, heat staked, or otherwise mechanically or chemically fastened to the bolster 16.

Figure 5:
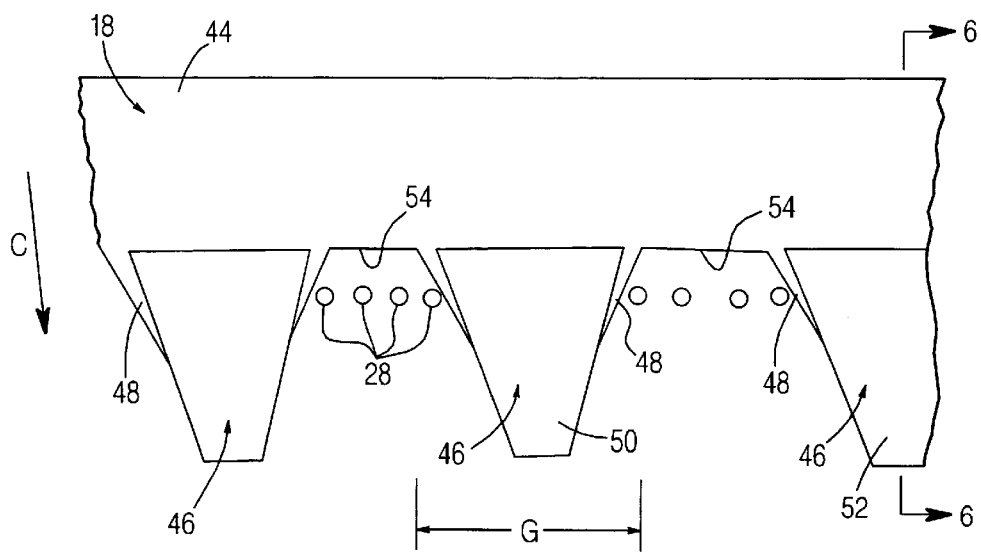
FIG. 5 is a detailed view of a portion of the fastener in FIG. 4 inserted between the second fibers of the seating surface in FIG. 2.

The fastener 18 also includes a series of hook members 46 that function to secure the fastener 18 to the seating surface 14, as shown in FIGS. 4 and 5. Each of the hook members 46 has a support portion 48 integrally formed with the attachment member 44 and extending in a direction C along the same plane as the attachment member 44. In alternative embodiments of the present invention, the support portion 48 may be separately attached to the attachment member 44, or may extend in a direction transverse to the plane of the attachment member 44.

As shown in FIG. 5, adjacent hook members, such as hook member 50 and hook member 52, cooperatively define a notch 54. The notch 54 allows the hook members 46 to be inserted into the gap G between the second fibers 30. During an insertion of the hook members 46, the hook members 46 might not be perfectly aligned with the gap G between the second fibers 30. For this reason, the hook members 46 preferably have a wedge shape along the same plane of the attachment member 44, as best shown in FIG. 5, to push aside the second fibers 30 and to align the hook members 46 with respect to the gap G. In an alternative embodiment, the hook members 46 may have a triangular shape along the same plane of the attachment member 44 or any other shape to ease the insertion of hook members 46 between the second fibers 30.

Figure 6:
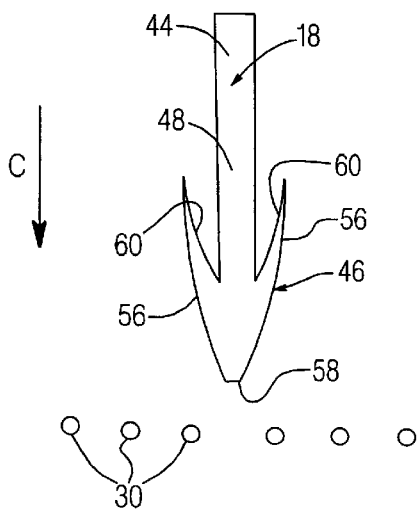
FIG. 6 is a cross-sectional view of the fastener in FIG. 5, taken along the line 6—6, located above the first fibers of the seating surface in FIG. 2.
Figure 7:
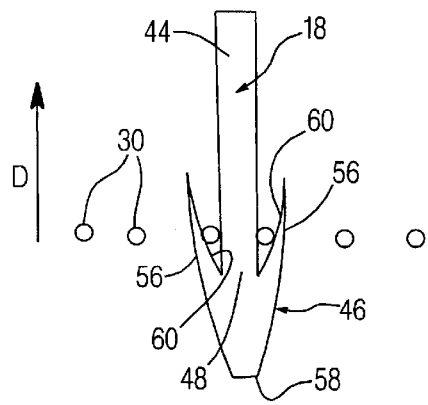
FIG. 7 is a view of the fastener in FIG. 6 inserted between and engaged with the first fibers.

As shown in FIGS. 6 and 7, each of the hook members 46 also has two barb portions 56 extending in a direction D, generally opposite direction C. The barb portions 56 of the hook members 46 provide the retention of the fastener 18 to the first fibers 28. The barb portions 56 have a wedge shape in a plane transverse to the plane of the attachment member 44, such that the head portion 58 of the hook members 46 may be inserted in the direction C between the first fibers 28. When pulled in the direction D, the barb portions 56 retain the hook members 46 on the first fibers 28 in the cavities 60, defined by the support portion 48 and the barb portions 56. In alternative embodiments, the barb portions 56 may form a ledge generally perpendicular to support portion 48, instead of defining a cavity 60, to retain the hook members 46 on the first fibers 28. Further, the hook members 46 may have only one barb portion or may have more than two barb portions.

The fastener 18 may be extruded or molded from a variety of materials, such as plastics, or may be made from any other process or any other material that provides sufficient strength for the attachment to the bolster 16 and to the first fibers 28.

The foregoing discussion discloses and describes a preferred embodiment of the present invention. One skilled in the art will readily recognize from such discussion, and from the accompanying drawings and claims, that changes and modifications can be made to the invention without departing from the true spirit and fair scope of the invention as defined in the following claims.

What is claimed is:

1. A seat assembly for a vehicle, said seat assembly comprising:
   a seat frame;
   a seating surface secured to said seat frame and having spaced apart generally parallel first fibers and spaced apart second fibers transverse to said fibers;
   a bolster; and
   a fastener having an attachment member securable to said bolster and a series of hook members extending from said attachment member, said hook members being insertable between said first fibers and said second fibers of said seating surface, said hook members having a barb portion extending therefrom to provide retention of said fastener to said first fibers thereby securing said bolster to said seating surface.

2. The seat assembly of claim 1, wherein said attachment member has a generally elongated shape substantially located in a first plane.

3. The seat assembly of claim 2, wherein said hook members extend from said attachment member along said first plane.

4. The seat assembly of claim 3, wherein said hook members have a generally wedge shape in a second plane transverse to said first plane to allow insertion of said hook members between said first fibers of said seating surface.

5. The seat assembly of claim 3, wherein said hook members have a generally wedge shape in said first plane to allow insertion of said hook members between said second fibers of said seating surface.

6. The seat assembly of claim 1, wherein said hook members have a second barb portion extending therefrom to provide retention of said fastener to said first fibers.

7. The seat assembly of claim 6, wherein said barb portion extends from a first side of said hook members to provide retention of said fastener on one of said first fibers, and said second barb portion extends from a second side of said hook members to provide retention of said fastener on another of said first fibers.

* * * * *